US006818853B1

(12) United States Patent
Schein et al.

(10) Patent No.: US 6,818,853 B1
(45) Date of Patent: Nov. 16, 2004

(54) VACUUM ARC PLASMA THRUSTERS WITH INDUCTIVE ENERGY STORAGE DRIVER

(75) Inventors: Jochen Schein, Alameda, CA (US); Andrew N. Gerhan, Oakland, CA (US); Robyn L. Woo, El Cerrito, CA (US); Michael Y. Au, Emeryville, CA (US); Mahadevan Krishnan, Oakland, CA (US)

(73) Assignee: Alameda Applied Sciences Corp., San Leandro, CA (US)

( * ) Notice: Subject to any disclaimer, the term of this patent is extended or adjusted under 35 U.S.C. 154(b) by 0 days.

(21) Appl. No.: 10/448,638

(22) Filed: May 30, 2003

(51) Int. Cl.[7] ................................................ B23K 10/00
(52) U.S. Cl. ............................. 219/121.52; 219/121.52
(58) Field of Search ....................... 219/121.48, 121.52; 313/359.1, 362.1, 161, 231.01, 361.1; 60/202; 315/111.21, 111.81

(56) References Cited

U.S. PATENT DOCUMENTS

| | | | | | |
|---|---|---|---|---|---|
| 4,466,242 | A | * | 8/1984 | Sovey et al. | 60/202 |
| 5,973,447 | A | * | 10/1999 | Mahoney et al. | 313/359.1 |
| 6,153,976 | A | | 11/2000 | Spanjers | |
| 6,216,445 | B1 | | 4/2001 | Byers et al. | |
| 6,269,629 | B1 | | 8/2001 | Spanjers | |
| 6,295,804 | B1 | | 10/2001 | Burton et al. | |
| 6,373,023 | B1 | | 4/2002 | Hoskins et al. | |
| 6,459,205 | B1 | | 10/2002 | Schall et al. | |
| 6,465,793 | B1 | | 10/2002 | Anders | |
| 2002/0008455 | A1 | * | 1/2002 | Fisch et al. | 313/359.1 |

OTHER PUBLICATIONS

Review of Scientific Inst. "Inductive Energy Storage Driven Vacuum Arc Thruster" vol. 73 No. 2, Feb. 2002.

* cited by examiner

*Primary Examiner*—Quang T Van
(74) *Attorney, Agent, or Firm*—Jay A. Chesavage

(57) ABSTRACT

An apparatus for producing a vacuum arc plasma source device using a low mass, compact inductive energy storage circuit powered by a low voltage DC supply acts as a vacuum arc plasma thruster. An inductor is charged through a switch, subsequently the switch is opened and a voltage spike of Ldi/dt is produced initiating plasma across a resistive path separating anode and cathode. The plasma is subsequently maintained by energy stored in the inductor. Plasma is produced from cathode material, which allows for any electrically conductive material to be used. A planar structure, a tubular structure, and a coaxial structure allow for consumption of cathode material feed and thereby long lifetime of the thruster for long durations of time.

20 Claims, 4 Drawing Sheets

Figure 1: Prior Art
High Voltage Pulsed Plasma Thruster
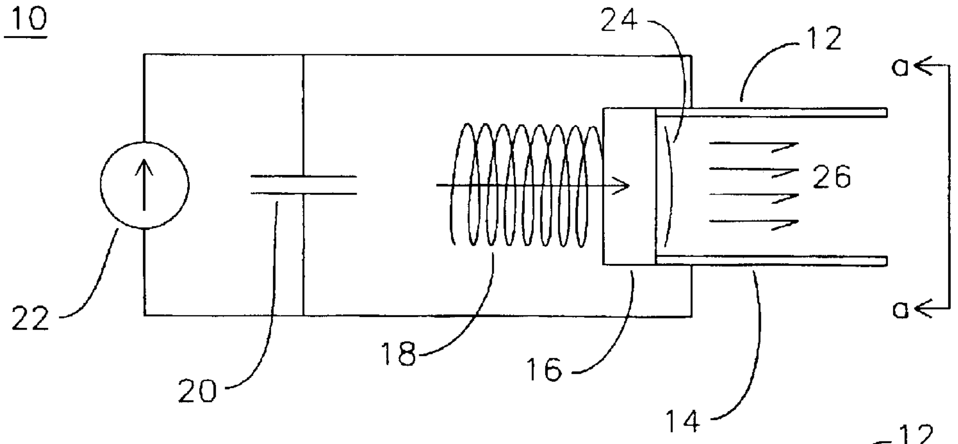
Figure 1a:
View a–a
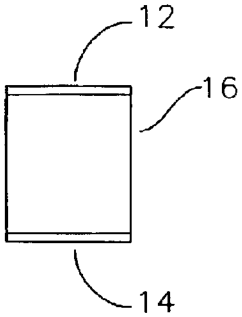
Figure 2:
Low Voltage Pulsed Plasma Thruster
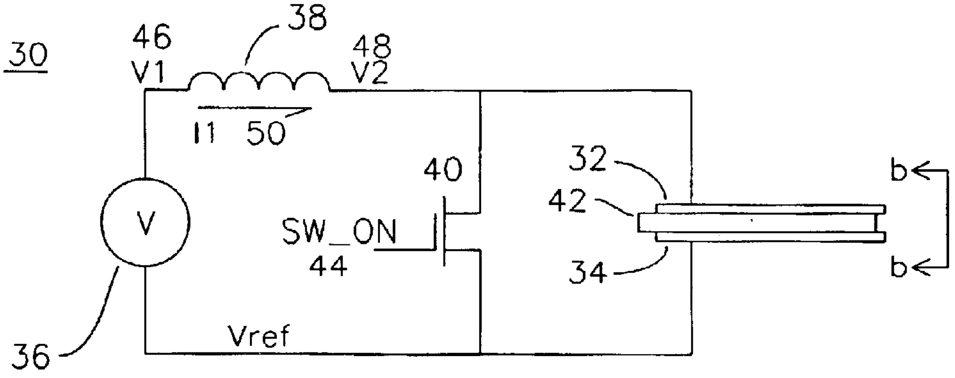
Figure 2a:
View b–b
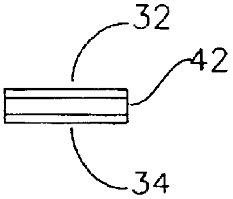

Timing and Sequence diagram

Electrode and Insulator Detail

Cylindrical Geometry section c–c section c–c

Coaxial Pulsed Plasma Thruster

VACUUM ARC PLASMA THRUSTERS WITH INDUCTIVE ENERGY STORAGE DRIVER

This invention was made with Government support under contract F29601-02-C-0016 awarded by the Air Force Research Laboratory and contract NAS3-02047 by the NASA Glenn Research Center. The Government has certain rights in this invention.

FIELD OF THE INVENTION

The invention pertains to the use of inductive energy storage power processing units for ignition and/or driving in conjunction with plasma sources that are especially tailored for vacuum arc plasmas used in propulsion devices. The stored inductive energy may be used to generate a plasma which may be used to propel or provide thrust control for a device in a gravitation-free environment, or in a fixed orbit about a planet in an atmospheric vacuum, such as outer space.

BACKGROUND OF THE INVENTION

Pulsed Plasma Thrusters (PPT) are used to provide periodic pulses of thrust for satellites in space. Prior art high voltage PPTs were constructed from coaxial electrodes with a PTFE propellant in a coaxial configuration such as U.S. Pat. No. 6,269,629 by Spanjers, and U.S. Pat. No. 6,295,804 by Burton et al, or in a parallel plate configuration such as U.S. Pat. No. 6,373,023 by Hoskins et al. These prior art PPTs are ignited and driven with high voltages stored in capacitors, with or without an external spark gap initiator. The energy storage of a capacitor may be expressed as $(\frac{1}{2})Cv^2$. Charging of the storage capacitors may be accomplished using high voltage supplies or by low voltage supplies followed by DC-to-DC converters which convert a low voltage into the necessary high voltage to charge the storage capacitor. The voltage stored in the capacitor results in a plasma discharge across the surface of an insulator made from a material such as PTFE (also known as Teflon®), which results in thermionic surface heating of the PTFE, and high speed discharge of the superheated PTFE particles and related plasma-PTFE byproducts. The superheated PTFE accelerates through an exit aperture, producing a reactive force for pulsed thrust control. Another prior art low voltage PPT uses a conductive propellant such as carbon whereby the ohmic heat generates a surface plasma, which releases particles of superheated carbon at high speed, as described in U.S. Pat. No. 6,153,976 by Spanjers. The previous examples of prior art used capacitors as a source of energy storage. Attempts to drive plasma sources with inductors have been made in the past but were abandoned due to the need for very high voltages to break-down the vacuum gap and the associated requirement that the electronic switch controlling the inductor must operate very fast and hold-off said high voltage. In the field of plasma assisted physical vapor deposition, a new plasma initiation method was introduced that employed surface breakdown along a metallized insulator separating anode and cathode to reduce the initiation voltage, as described in U.S. Pat. No. 6,465,793 by Anders. This reference describes a capacitive driver and a pulse-forming network which is charged up to a voltage allowing the surface breakdown to occur, typically in excess of 1000V. The storage capacitor is charged by a voltage supply providing the required 1000V. Inductive energy storage ignition has been used in the past but was not used in connection with the above mentioned low voltage initiation and therefore required the output of very high breakdown voltages, which had to be held off by some kind of switching device making this approach very complicated due to the lack of adequate compact semiconductor devices. The prior art systems using either a storage capacitor charged to a high voltage or inductive energy storage required high speed switching of large voltages, which is difficult to do without incurring switching losses, and also typically restricts or eliminates the use of semiconductor devices because of the high voltage requirements. In addition, the use of capacitors adds a significant amount of mass to the systems and limits the lifetime as high voltage capacitors have been shown to deteriorate with time.

A new class of device is known as a vacuum arc thruster (VAT), which contrasts with the prior art Pulsed Plasma Thruster (PPT) in several ways. The prior art PPT uses a surface discharge, which ablates the insulator material as a propellant, and avoids eroding the electrodes. The acceleration mechanism of the PPT is dominated by a j×B force. The vacuum arc thruster (VAT) uses the cathode material as the propellant, which forms a low impedance plasma. The acceleration mechanism is dominated by pressure gradients formed by the expanding plasma, in addition to the j×B force described earlier. The ignition mechanism is also different between a PPT and a VAT. The VAT uses a voltage breakdown across a very small gap, while the PPT uses a surface discharge, which is frequently assisted by a spark plug or even a laser. References to the present invention will refer to a vacuum arc thruster (VAT) to contrast from the prior art pulsed plasma thruster (PPT). In the present invention, the electrodes are the propellant, and the insulator is not consumed by the plasma. The voltage and current characteristics through the plasma discharge are different between the present VAT invention and the prior art PPT. After ignition, the VAT operates for the rest of the pulse at a fairly constant voltage and the current reduces, whereas the voltage and current characteristics of a PPT are the opposite.

What is desired in a VAT is a low mass, low voltage device (<1000V) which uses inductive energy storage rather than capacitive energy storage, which forms a plasma from a conductive layer of material which is formed over an insulator surface, where the conduction layer is a different or the same type of material as used in the cathode, and which provides an electrode geometry which is either parallel plate or coaxial.

OBJECTS OF THE INVENTION

A first object of the invention is a vacuum arc thruster which uses inductive energy storage to generate a plasma arc.

A second object of the invention is a vacuum arc thruster in a parallel plate configuration, whereby one of the plates is a cathode electrode, the other plate is-an anode electrode, and an insulating separator is placed between the cathode electrode and the anode electrode. The insulating separator includes a rough surface for the addition of a metallization layer in the region where a plasma may form.

A third object of the invention is a vacuum arc thruster where the metallization layer is formed from the same material used to form the cathode.

A fourth object of the invention is a pulsed plasma thruster in either a coaxial, a planar, or a ring configuration, whereby one of the electrodes is a cathode, the other electrode is an anode, and an insulating coaxial separator is placed between the cathode and the anode. The insulating separator includes a rough surface for the addition of a metallization layer.

A fifth object of the invention is a pulsed plasma thruster where the anode electrodes are chosen from one of the group of materials titanium, copper or gold, the insulators are chosen from the group of materials alumina silicate or alumina, and the cathode electrodes are chosen from one of the group of materials carbon, aluminum, titanium, chromium, iron, yttrium, molybdenum, tantalum, tungsten, lead, bismuth, or uranium.

A sixth object of the invention is a pulsed plasma thruster comprising:

a power source having an anode output and a cathode output, the power source comprising a voltage source in series with an energy storage device in series with a switch, the switch having a terminal coupled to the anode output and a terminal coupled to said cathode output;

a planar plasma thruster including an insulator having two substantially parallel surfaces, a cathode electrode placed on one of said insulator surfaces, an anode electrode placed on other said insulator surface, where the insulator has an area of preferred plasma formation between the anode electrode and the cathode electrode, the preferred plasma formation area having a film of conductive material.

A seventh object of the invention is a pulsed power thruster which uses the magnetic field energy stored in an inductor to create a magnetic field which can be used to steer the particles providing propulsion.

SUMMARY OF THE INVENTION

The present invention uses a low voltage DC source, an inductive energy storage device, and a switch circuit to initiate and drive a vacuum arc pulsed plasma thruster. The plasma source is based on an inductive energy storage circuit plasma power unit and thruster head geometry. In the plasma power unit, an inductor is charged through a switch to a first current threshold. When the switch is opened, a voltage peak L(di/dt) is produced, which initiates a plasma arc by first forming microplasmas across the microgaps formed by breaks in a thin conductive surface applied to the surface of an insulating separator positioned between the anode electrode and the cathode electrode. The plurality of initial microplasma sites assists in the initiation of the main plasma discharge. The typical resistance of the separator disposed between anode electrode and cathode electrode which can either be a metal film coated insulator or a solid material of high resistivity is ~100 Ω-1kΩ from anode to cathode. One class of material for the separator is alumina silicate, which may optionally be film-coated with a conductive material of the same or different material than the cathode electrode. Porosity of this separator and/or small gaps in the conducting area generate micro-plasmas by high electric field breakdown. These micro-plasmas expand into the surrounding space and allow current to flow directly from the cathode to the anode along a lower resistance plasma discharge path (~10's of mΩ) than the initial, thin film, surface discharge path. The current that was flowing in the solid-state switch (for $\leqq 1$ μs) is fully switched to the vacuum arc load after the solid state switch is opened. Typical currents of ~100 A (for ~100–500 μs) are conducted with voltages of ~25–30 V. Consequently, most of the magnetic energy stored in the inductor is deposited into the plasma pulse. The combination of the PPU with a variable low voltage control signal is converted into a sufficient trigger signal for the semiconductor switch. This low voltage control signal in turn controls the opening and closing of the semiconductor switch and thereby the energy stored in the inductor, which in turn determines the energy delivered into the plasma. This method leads to an effective "throttle" for the propulsion system. Throttle control may be done either by changing the repetition rate of the current pulse, or by changing the duty cycle of the current pulse applied to the energy storage element or inductor.

The combination of the PPU with additional semiconductor switches allows for distribution of the output energy to more than one thruster head while using the same inductor, thereby enabling a low mass, multiple output system. The expanding plasma from the thruster heads is providing a thrust depending on the plasma velocity and mass flow rate of the cathode material. Therefore the thruster heads have to be designed to offer a large amount of cathode material (propellant) for consumption in order to operate for a long period of time. The condition of the conductive separator is essential for reliable performance of the thruster and needs to be taken into account.

One geometry for the separator is a planar geometry whereby the thruster head consists of three sheets of material stacked onto each other. A first sheet forms a cathode, a second sheet forms the anode and the third sheet disposed between the anode sheet and the cathode sheet forms a separator sheet comprising a material with bulk insulating or conductive properties with a thin film conductive layer applied in the desired area of the plasma formation.

Another geometry is a tubular design, which consists of three different disk shaped sheets of material (cathode, separator, anode) which are stacked onto each other where the plasma ignition takes place inside the tube with the plasma expanding on the anode side. The separator disk is disposed between the cathode and anode, and the inside surface may be coated with a thin film conductive layer.

Optionally with either design, a grid may be placed on the anode side of the thruster and held either at the anode potential, or a separate potential to steer the particles.

Also optionally with either geometry, the inductor used for energy storage may be placed around the exit aperture of the thruster to steer particles for maximum thrust.

BRIEF DESCRIPTION OF THE DRAWINGS

FIG. 1 shows a circuit diagram and mechanical arrangement of components for a prior art pulsed plasma thruster (PPT).

FIG. 2 shows a circuit diagram and mechanical arrangement of components for a low voltage pulsed plasma thruster.

FIG. 2*a* shows a front view of the pulsed plasma thruster of FIG. 2.

DETAILED DESCRIPTION OF THE INVENTION

Figure 3:
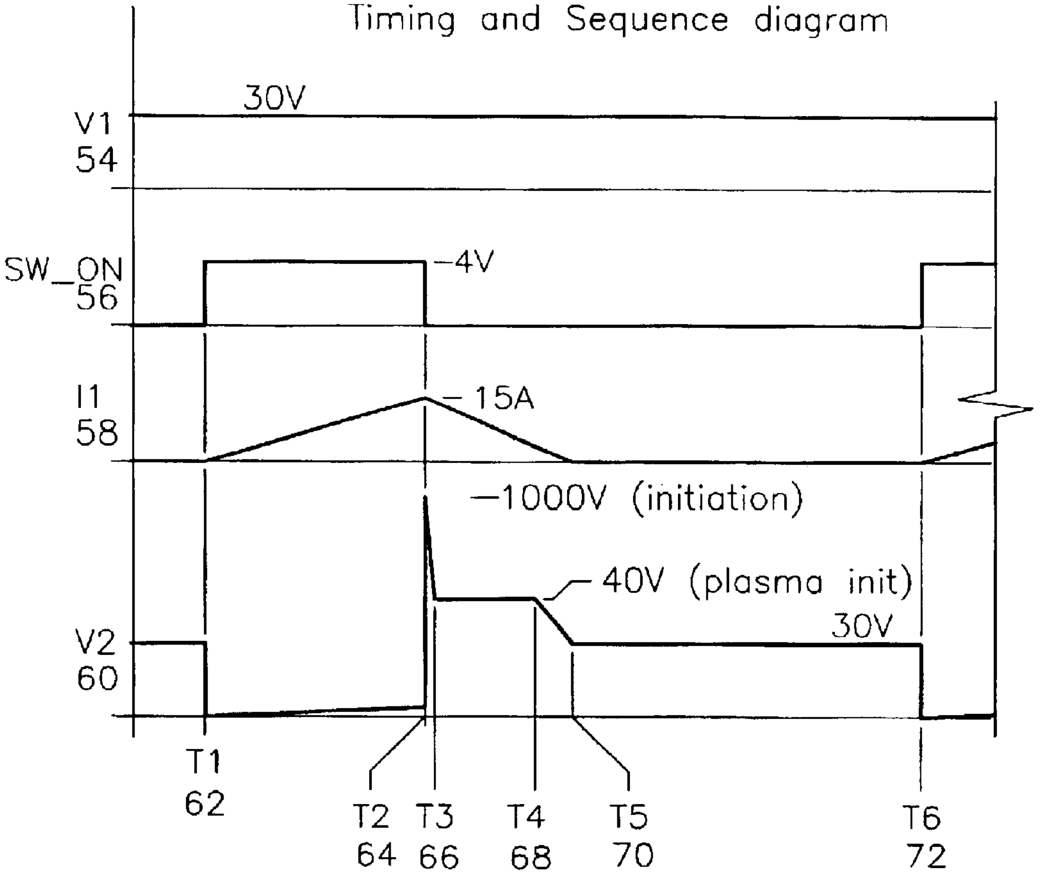
FIG. 3 shows the voltage and current waveforms for the plasma thruster of FIG. 2.

The present letters patent describes a low mass vacuum arc thruster system using a PPU that uses inductive energy storage (IES) as shown in FIG. 1. Since no high voltage energy storage capacitors are needed for this circuit, the driver is compact, low-mass and has long lifetime. The mass of this system can be as low as ~60 g for the driver and ~30 g for the arc source.

FIG. 1 shows a circuit diagram and mechanical diagram for a prior art pulsed plasma thruster. A current source or current limited voltage source 22 is applied to a storage capacitor 20. The capacitor 20 provides charge to a positive anode electrode 12 and a negative cathode electrode 14 which are separated by an insulator 16 which also acts as a propellant, and-is made of a material such as PTFE. When the voltage across the capacitor 20 reaches a voltage sufficient to reach dielectric breakdown, a plasma arc 24 develops, and the high plasma temperature causes the insulator and propellant 16 to emit particles and create an ionized plasma 26. The Lorentz body force on the plasma due to the interaction of the discharge current and its self-magnetic field, j×B, causes acceleration of the plasma and ejection from the electrode ends, resulting in a thrust on the electrodes and any object attached to said electrodes of the thruster 10. Spring 18 causes insulator 16 to translate towards electrodes 12 and 14 as the insulator and propellant 16 are consumed.

FIG. 1*a* shows a section a—a of FIG. 1, and it can be seen that planar anode electrode 12 is separated from planar cathode electrode 13 by insulator and propellant 16.

FIG. 2 shows the low voltage pulsed vacuum arc thruster. A voltage source 36 enables current to flow through energy storage inductor 38 when switch 40 is enabled. The current I1 50 increases in inductor 38 until switch 40 opens, where the output voltage 48 V2 instantaneously increases until it achieves the arc initiation potential, and an arc develops from anode electrode 32 to cathode electrode 34 across insulator 42.

FIG. 2*a* shows the front view of anode electrode 32, cathode electrode 34, and insulator 42. The insulator extends beyond the electrodes at the sides to encourage the plasma arc to from on the front-facing edge, so the geometry of reaction is as shown in FIG. 1.

FIG. 3 shows the timing and sequence diagram for FIG. 2. Voltage source 36 produces a steady voltage V1 54, shown as 30 Volts, although it could be any voltage. The control voltage SW_ON 56 which is applied to switch gate 44 is shown from T=0 to T=T1 as being 0 volts, and from T=T1 to T=T2 to be 4V, and from T3 thereafter as returning to 0 volts until the waveform repeats at T6. The current in the inductor I1 50 is shown as curve I1 58. Until the switch 40 turns on at T2 64, no current flows. During the interval from Ti to T2, the current I1 rises to a level equal to 1/{L(V(T2-T1)}, while the voltage V2 60 slowly increases due to the finite resistance of switch 40. At T2, when the switch opens, the instantaneous change in current causes the voltage V2 60 to develop to the initiation potential on the order of 1000V until a plasma discharge develops around 40V while the inductor discharges from T3 66 to T4 68. When there is insufficient current to maintain a plasma arc, the voltage drops to the voltage source 36 level of V1 30V.

Figure 4:
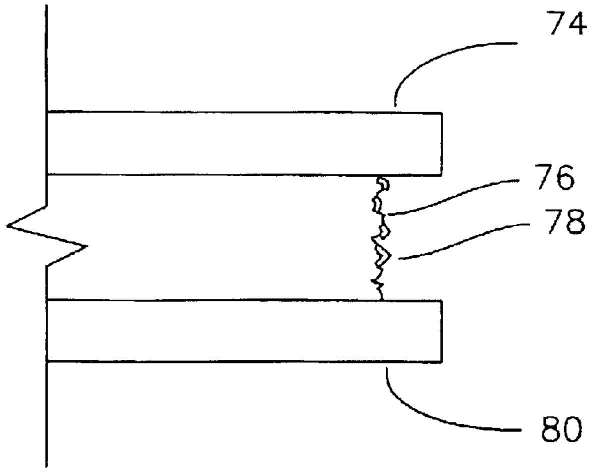
FIG. 4 shows the detail of the surface of the insulator of FIG. 2.

FIG. 4 shows the plasma formation detail on the surface of the insulator 42. In the operation of the low voltage pulsed plasma thruster 30, the surface of the insulator 76 is roughened to allow a metal film deposition 78 to mechanically adhere-to the surface. The metal film may be of the same material or a different material than used for the cathode electrode 80. As was described earlier, the metallization is incomplete, and the application of the plasma voltage causes microplasmas to form at the metallization gaps. Over multiple plasma discharges, the metal film used in the initial deposition is replaced by material which vaporizes from the cathode, and is re-deposited on the insulator 76. In contrast with the prior art high voltage pulsed plasma thruster of FIG. 1 where the insulation is consumed by the plasma, in the low voltage plasma thruster 30, the cathode electrode 34 is consumed by the plasma during successive discharges, and the plasma re-deposits conductive cathode material on the separator 42 which replaces the material on the surface of the separator 42 consumed in each successive plasma discharge. Over successive discharges, the conductive film that was initially present is replaced by cathode material.

Figure 5:
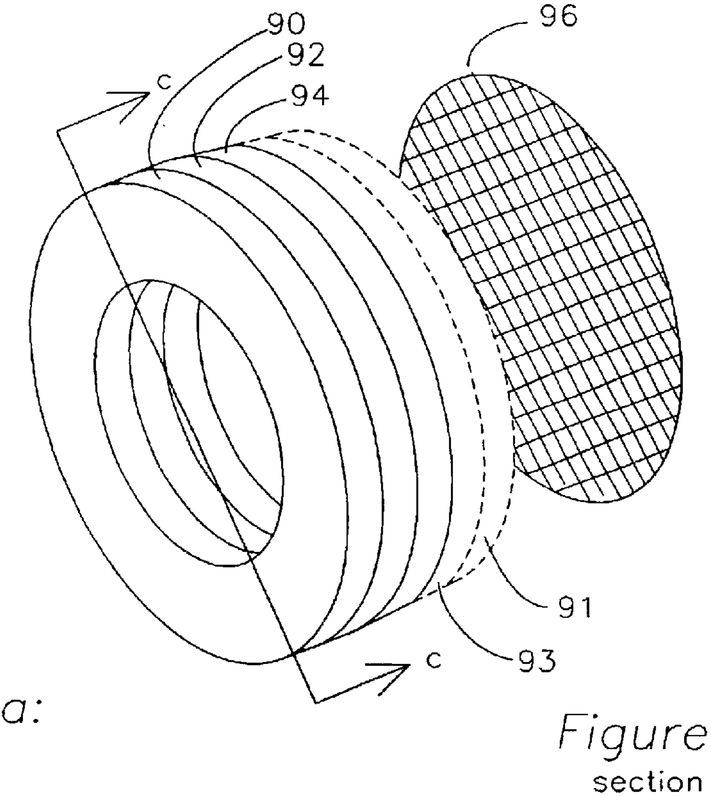
FIG. 5 shows a pulsed plasma thruster having a cylindrical geometry.
Figure 5A:
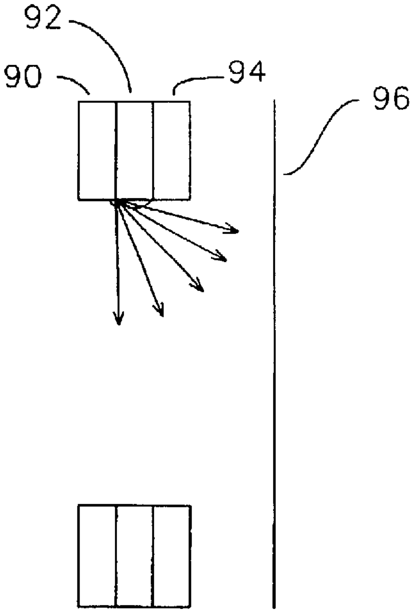
FIG. 5*a* shows a section view c—c of FIG. 5.

FIG. 5 shows the circular geometry of the present invention. There are two embodiments of the ring structure of FIG. 5. In the first embodiment, an insulating ring 92 has a conductive ring cathode 90 placed on a near side, and a conductive ring anode 94 placed on a far side. Additional elements 91 and 93 are not present in the first embodiment. The circular geometry of FIG. 5 is driven by the circuit of FIG. 2, where the anode electrode 32 is replaced by the anode electrode 90 of FIG. 5, and the cathode electrode 34 is replaced by the cathode electrode 94 of FIG. 5. FIG. 5*a* shows the side section view c-c of FIG. 5. An optional screen 96 may be present for accelerating the particles leaving the thruster, and the screen may be at the anode potential, or a different potential, as required to electrostaticly accelerate the particles and increase the pulsed thrust. FIG. 5*a* shows the section c—c of the first embodiment.

Figure 5B:
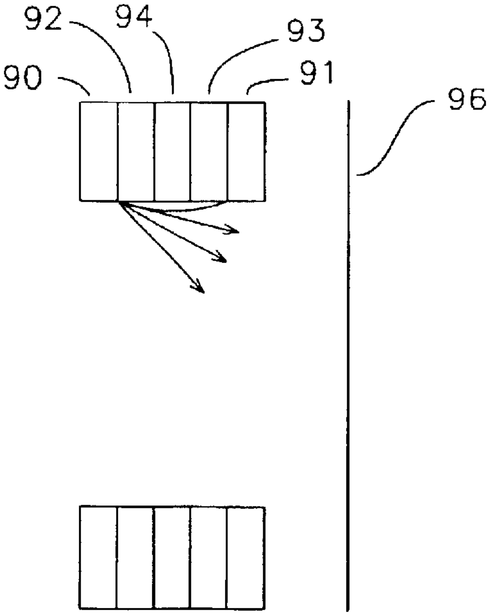
FIG. 5*b* shows an alternate embodiment of the section c—c of FIG. 5.

The second embodiment of FIG. 5 includes separator 93 and “main anode” 91, and 94 becomes an “ignition anode”. Separators 92 and 93 are formed of an insulating material, as before, which may be coated with a thin layer of conductive material. In this second embodiment, the cathode electrode 90 is driven by a negative potential as was provided to electrode 34 of FIG. 2. The “main anode” 91 is driven by as positive potential, as was provided to anode electrode 32 of FIG. 2. The “ignition anode” 94 is driven through a resistor of about 50 ohms to the “main anode” 91. Initially, a plasma initiation occurs from cathode electrode 90 to the ignition anode 94, and passes through the 50 ohm resistor which is tied to the main anode 91. The purpose of the 50 ohm resistor is to reduce the current density in the initial ignition plasma, and to encourage the plasma to migrate to the main anode 91, so that the final plasma is between cathode electrode 90 and main anode electrode 91. The effect of this on the force vectors is shown in FIG. 5*b* in comparison to the first embodiment 5*a*. By changing the arc of the plasma to be more flattened, fewer force vectors are produced which are orthogonal to the desired direction of force along the main axis.

The VAT—relies on expansion of the plasma driven by a pressure gradient in the arc spot. The shape of the plasma expansion follows a cosine law.

$$n=k\cdot I/r^2\cdot\cos\mu,$$

with n being the plasma density, k represents a constant factor of the order 1013 A-1m-1, I the arc current, r the distance to the arc spot and $\mu$ the angle of expansion. Looking at this formula it is obvious that significant re-deposition is only possible within a small angle. Planar geometries such as FIG. 2 will provide only very little re-deposition because the plasma expansion is directed away from the insulator surface. In order to counter this effect a ring-shaped geometry of FIG. 5 was developed. In principle the ring geometry thruster consists of a stack of metal rings. In the second embodiment, the first ring 90 acts as the cathode, which is separated from the “ignition anode” 94 by an insulating ring 90 which may also be coated with a metallic thin film as was described earlier. The "ignition anode" 94 could be connected to the main anode by a 30Ω resistor. In practice, the initial ignition would occur with the ignition anode, and would be replaced by ignition through the main anode. When the ignition voltage is applied an initial arc is formed between the "ignition anode" and the cathode across the conductive layer inside the "tube". The anode attachment commutates to the main anode driven by the voltage drop across the resistor. By doing this, the plasma is directed more towards the center of the tube and away from the conductive layer. When the plasma is established, most metal re-deposition takes place on the location opposite to the arc spot. Although this does not "heal" the damage caused by the initial ignition it produces another ignition spot at a different location on the cathode ring. The cathode will subsequently get eroded homogenously. Even though the arc spot and thereby the location of the thrust producing plasma changes with every pulse the thrust vector remains constant due to the "ignition anode"/main anode configuration. Varying the current and the inner diameter of the thruster can control re-deposition. With increasing current more material is re-deposited and by reducing the diameter of the thruster effective re-deposition is increased as well. The same principle works with just a single anode of the first embodiment, although the location of the arc spot will have more influence on the thrust vector.

The energy storage element 38 of FIG. 2 may be an iron or ferrite core inductor, or it may be an air core inductor. In the case of an air core inductor, it is possible to arrange its geometry to use the inductive field in combination with the charged particles emitted from the thruster such that a Lorenz force formed by the interaction of the charged particles and the inductor magnetic field increases the thrust.

Figure 6:
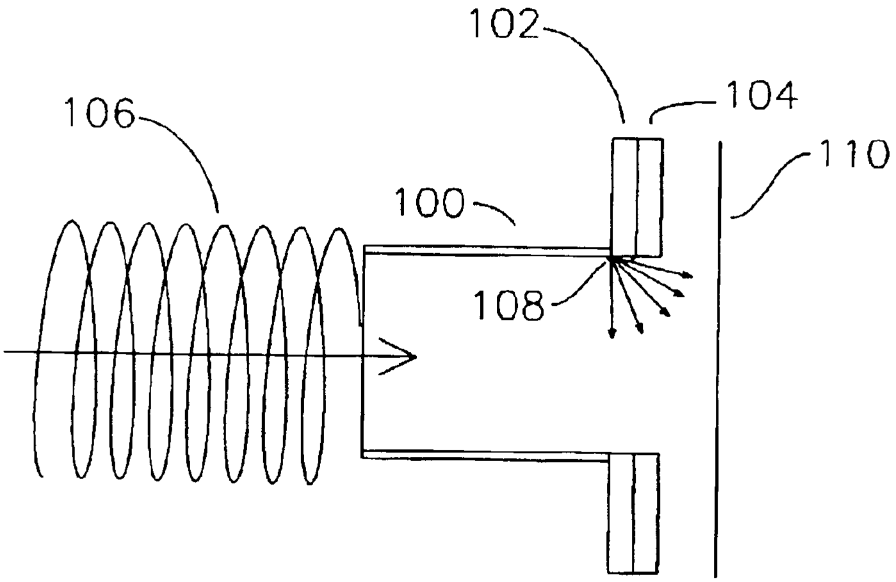
FIG. 6 shows a circular geometry plasma thruster.

FIG. 6 shows an alternative embodiment of the circular geometry including a circular electrode feeder. The operation is similar to the circular geometry of FIG. 5, where there is an anode electrode 104 similar to 94 of FIG. 5, and a separator electrode 102 similar to 92 of FIG. 5, however instead of fixed position cathode electrode 90 of FIG. 5, FIG. 6 shows the cathode electrode as a thin tube 100 which is pressed with spring pressure 106 into insulator spacer 102. In this manner, the cathode electrode 100 is replenished as the electrode is consumed by re-deposition of cathode material across the separator 102 and ejection of cathode material from beyond the anode electrode 114. An optional screen 110 may carry a potential for the acceleration of plasma particles. Anode electrode 114 and cathode electrode 112 are connected in place of the respective electrodes 34 and 32 of FIG. 2.

Figure 7:
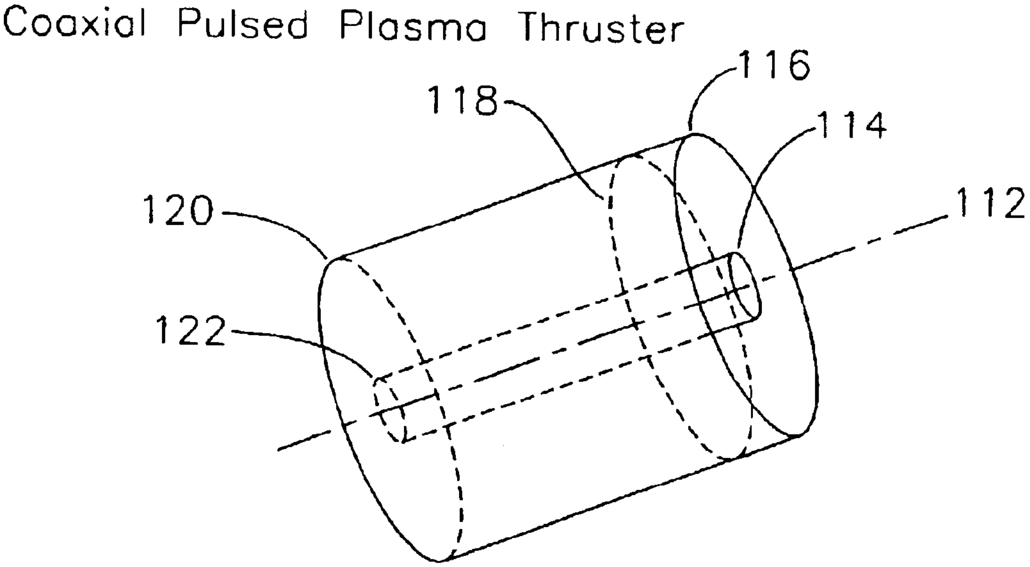
FIG. 7 shows a coaxial geometry plasma thruster.

FIG. 7 shows the coaxial geometry for the thruster, which includes a central axis 112, a first electrode 116 with conductor 120 and a second electrode 114 with electrode 122, and an insulating separator 118 positioned between. The first electrode 116 and second electrode 114 may respectively be either the anode and cathode, or cathode and anode. As was described earlier, the insulating separator 118 may made from an insulator such as alumina silicate, and the surface on the thrust surface of the insulator may have a thin conductive layer applied which encourages the formations of microplasmas that expand into a plasma which superheats the metal film and produces propulsion through the superheating and consumption of the metal film. As before, the consumed metal film is replaced by re-deposition of the cathode material from the plasma arc.

The voltage source 36 used to create the stored current in the inductor may be 30V, and it may be sourced by a prior art power supply as known to one skilled in the art. The storage element may be an inductor of an iron core or powdered ferrite core or an air core.

The model of the arc itself can be established by empirical methods. The energy from the inductor is transferred to the arc with an efficiency of about 92%. In combination with the other results, an overall efficiency of the VA-T of ≈15–20% can be predicted. The Current and voltage traces shown in FIG. 3 were obtained with an inductor of 250 μH and a charging time (time from Ti 62 to T2 64) of 58 μs.

The same system can operate with a variable inductor charging time Ti 62 to T2 64, providing a highly adjustable output, thereby allowing the individual impulse to be varied over a wide range of operating currents. Experimental results show the strong dependence of impulse on the charging time and energy in the pulse. For example, when calculating the arc energy for a 59 μs charging time we obtain ≈0.015J which results in a 0.21 μNs impulse bit. Increasing the charging time to 200 μs (FIG. 11) results in a 0.2J pulse producing a 3.89 μNs impulse bit. The change of charging time can be adjusted in the electronics by adjusting the trigger electronics for the semiconductor switch that is used (either an IGBT or a MOSFET). This can be achieved by using a MOSFET as a part of the resistive part of a timing circuit, thereby adjusting the RC constant. The on resistance Rds(on) of a MOSFET is a characteristic of device geometry, and should be chosen for lowest RDS(on) where the associated increase in Cds (capacitance from drain to source) does not reduce the output efficiency through ringing in the output stage, as is well known to one skilled in the art.

As the semiconductor switch is triggered by an incoming control signal SW_ON 44 represented in FIG. 3 as a rectangular signal 56, the output of the system can be changed via the pulse format of said incoming signal. The thrust output may be controlled with SW_ON 44 by varying the overall duty cycle of the signal formed by the ratio (T2-T1)/(T6-T1), or the per-repetition level of current in the inductor (T2-T1) which varies the energy stored in the inductor. This in turn changes the amount of energy transferred to the arc and the impulse bit of the individual pulse.

In order to validate a remotely adjustable PPU, which essentially utilizes adjustable trigger signals for the semiconductor switch in the IES circuit, two designs have been developed.

As is known to one skilled in the art of pulse-forming networks, there are many ways to generate control signal SW_ON 44. One design may use TTL timer circuits based on changing the RC constants used internally to produce a trigger signal with a certain length and repetition rate. The two timer circuits used for this purpose are an NE 555 timer IC for the repetition rate and a TTL 74221 LS monostable multivibrator for the width of the trigger pulse. In order to change the output pulse shape of these ICs, the design may use digital potentiometers such as AD 8400 by Analog Devices. They provide a 256 position, digitally controlled, variable resistor device. Changing the programmed resistor setting is accomplished by clocking in a 10 bit serial data word into the serial data input. This can be done by the on-board μProcessor.

Another controller embodiment may use a microprocessor with a single output bit which is translated by a level shifter such as the 40109 or other switch driver/level shifter commonly available from manufacturers such as Maxim to interface the microprocessor output voltage to the level desired for SW_ON 44. The microprocessor controls a signal with pulses of the required length and repetition rate to the level shifter, where they are converted to the control signal SW_ON 44, which may result in a lower mass PPU.

Another important feature for the performance of the thruster system is the arc source. The arc source itself can be any embodiment where a cathode and an anode are separated by a highly resistive but not fully insulating material. A planar geometry has shown in FIG. 2, a ring geometry was shown in FIGS. 5 and 6, and a coaxial geometry as shown in FIG. 7 is possible. The geometry of the arc source not only influences the thrust vector by providing different arc ignition points but also, in case of the separator being a metallic thin film covering an insulator, influences the amount of material that is replenishing the thin metallic layer.

The best mode for any of the geometries with respect to the separator or insulator layer (42 of FIG. 2, 92 of FIG. 5, 116 of FIG. 7) is where two electrodes are separated by a single resistive sheet 42 of the order 1 mm in thickness. The insulator can be recessed with respect to the anode and/or cathode. As the plasma ignition takes place close to the cathode/separator interface, possible ignition points are located all the way along this interface. Each ignition leads to erosion of the cathode electrode and, in the case of a metallic thin film on the separator surface, the subsequent plasma pulse provides re-deposition. The location of the ignition spot is determined by the size of voids in the interface. The plasma will ignite where the voids are small, thus producing a sufficient electric field to break down the vacuum gap. The ongoing erosion and re-deposition changes the distribution and size of voids.

When a given local area can no longer provide the smallest void size, the ignition moves to another global region along the rectangular electrodes. In this manner, the bi-level thrust vector (known as a BLT thrust vector) moves up and down along the rectangular surface, allowing the entire mass of electrodes to be consumed gradually. Effectively, such an arrangement allows a large quantity of electrode material to be consumed without need for mechanical motion, such as via a spring or other device, to feed the propellant. Longest lifetimes have been measured using a geometry where the insulator is recessed with respect to both the anode and the cathode.

The erosion is very homogenous across the cathode surface. The thrust vector is directed away from the cathode surface but the origin of the vector moves with the cathode attachment. This has to be taken into account when using the thruster for fine positioning.

Using the geometries shown in the drawing figures, one choice for an insulator is Aluminum-Silicate, and one choice for the conductive thin film coating is graphite which is applied by dissolving the graphite in methanol, which produces a starting resistance of the order 100Ω on –1kΩ.

The feed mechanism of FIG. 6 allows for a very simple yet effective feed mechanism to be developed. By replacing the cathode ring of FIG. 5 (first or second embodiment as shown in cross sections FIGS. 5*a* and 5*b* respectively) with a thin walled tube the amount of propellant to be used can be increased significantly During operation of the thruster the cathode material close to the insulator will be eroded. Due to the re-deposition process the preferred cathode attachment will move along the cathode/insulator interface and homogenous erosion will take place. When the part of the tube closest to the insulator is eroded sufficiently the force of a spring pushing on the tubes back end will force the tube to move forward until it is flush with the insulator surface. While this feeding approach is feasible it might become cumbersome for long missions where a large mass of propellant material will have to be used. Another embodiment can solve the following problem: by replacing the tube with a large number of tiny metal balls more appropriate methods of material storage might be employed. In order to do this a ceramic guide will have to be constructed, leading the replacement balls to the right location, but even this will be possible by using the force of a simple spring.

The materials used for the anode may include any conductor including titanium, copper, gold, or any high thermal conductivity and high electrical conductivity material. The materials used for the cathode may include any conductor including carbon, aluminum, titanium, chromium, iron, yttrium, molybdenum, tantalum, tungsten, lead, bismuth, or uranium. The materials used for the insulator may include alumina silicate, alumina, or any insulator with a rough surface texture enabling adhesion by the applied conductive film. The materials listed are only shown as examples, and are those which achieve the objects of the invention. Other materials may be used without reduction in function or performance.

In the manner of these various embodiments, an improved pulsed plasma thruster has been fully disclosed.

What is claimed is:

1. A vacuum arc plasma thruster having a ring geometry, said thruster comprising:

- a power source having an anode output and a cathode output, said power source comprising:
- a voltage source in series with an energy storage device in series with a switch, said switch having a terminal coupled to said anode output and a terminal coupled to said cathode output;
- a ring plasma thruster including:
- a ring insulator having two substantially parallel surfaces, an inner diameter, and an outer diameter;
- a ring cathode electrode having two substantially parallel surfaces, an inner diameter, and an outer diameter, said cathode electrode placed on one of said insulator surfaces;
- a ring anode electrode having two substantially parallel surfaces, an inner diameter, and an outer diameter, said ring anode electrode placed on other said ring insulator surface;
- said insulator having an area of preferred plasma formation between said anode electrode and said cathode electrode on said inner diameter;
- said preferred plasma formation area having a film of conductive material;
- said power source anode output coupled to said anode electrode and said power source cathode output coupled to said cathode electrode.

2. The vacuum arc plasma thruster of claim 1, where said energy storage device is an inductor.

3. The vacuum arc plasma thruster of claim 2 where said inductor is a magnetic core inductor.

4. The vacuum arc plasma thruster of claim 2 where said inductor is an air core inductor.

5. The vacuum arc plasma thruster of claim 1 where said insulator includes one of the materials alumina silicate or alumina.

6. The vacuum arc plasma thruster of claim 1 where said anode includes one of the materials titanium, copper, or gold.

7. The vacuum arc plasma thruster of claim 1 where said switch on time and said switch off time is varied in an aperiodic manner to control thrust.

8. The vacuum arc plasma thruster of claim 1 where said switch cycle time is fixed and said on time is varied to control thrust.

9. The vacuum arc plasma thruster of claim 1 where said switch on time is fixed and said switch off time is varied to control thrust.

10. The vacuum arc plasma thruster of claim 1 where said cathode carries a negative voltage compared to said anode after said switch is opened.

11. A vacuum arc plasma thruster having a ring geometry, said thruster comprising:

a power source having an anode output and a cathode output, said power source comprising:

a voltage source in series with an energy storage device in series with a switch, said switch having a terminal coupled to said anode output and a terminal coupled to said cathode output;

a ring plasma thruster including:

a first ring insulator having two substantially parallel surfaces, an inner diameter, and an outer diameter;

a ring cathode electrode having two substantially parallel surfaces, an inner diameter, and an outer diameter, said cathode electrode placed on one of said insulator surfaces;

a ring ignition anode electrode having two substantially parallel surfaces, an inner diameter, and an outer diameter, said ring ignition anode electrode placed on other said first ring insulator surface;

said first ring insulator having an area of preferred plasma formation between said anode electrode and said cathode electrode on said inner diameter;

a second ring insulator having two substantially parallel surfaces, an inner diameter and an outer diameter, said second insulator placed on remaining surface of said ring ignition anode;

a ring main anode electrode having two substantially parallel surfaces, an inner diameter, and an outer diameter, said ring ignition anode electrode placed on other said first insulator surface;

said power source anode output coupled to said main anode electrode and to said ignition anode electrode through a dissipation element, and said power source cathode output is coupled to said cathode electrode.

12. The vacuum arc plasma thruster of claim 11, where said energy storage device is an inductor.

13. The vacuum arc plasma thruster of claim 12 where said inductor is a magnetic core inductor.

14. The vacuum arc plasma thruster of claim 12 where said inductor is an air core inductor.

15. The vacuum arc plasma thruster of claim 11 where said insulator includes one of the materials alumina silicate or alumina.

16. The vacuum arc plasma thruster of claim 11 where said anode includes one of the materials titanium, copper, or gold.

17. The vacuum arc plasma thruster of claim 11 where said switch on time and said switch off time is varied in an aperiodic manner to control thrust.

18. The vacuum arc plasma thruster of claim 11 where said switch cycle time is fixed and said on time is varied to control thrust.

19. The vacuum arc plasma thruster of claim 11 where said switch on time is fixed and said switch off time is varied to control thrust.

20. The vacuum arc plasma thruster of claim 11 where said cathode carries a negative voltage compared to said anode after said switch is opened.

* * * * *

UNITED STATES PATENT AND TRADEMARK OFFICE

CERTIFICATE OF CORRECTION

PATENT NO. : 6,818,853 B1
APPLICATION NO. : 10/448638
DATED : November 16, 2004
INVENTOR(S) : Jochen Schein et al.

It is certified that error appears in the above-identified patent and that said Letters Patent is hereby corrected as shown below:

Column 5 line 62 “adhere-to” should be changed to --adhere to--

Column 8 lines 10 and 12, “Ti” should be changed to --T1--

Column 9 line 49 “100Ω on -1kΩ” should be changed to --100Ω - 1kΩ--

Signed and Sealed this

Thirtieth Day of December, 2008

JON W. DUDAS
*Director of the United States Patent and Trademark Office*